(12) United States Patent
Kirsner et al.

(10) Patent No.: US 7,485,602 B2
(45) Date of Patent: *Feb. 3, 2009

(54) DRILLING METHOD USING ISOMERIZED OLEFINS AND PARAFFIN HYDROCARBONS AS BASE OILS FOR INVERT EMULSION OIL MUDS

(75) Inventors: Jeff Kirsner, Friendswood, TX (US); Kenneth W. Pober, Houston, TX (US); Robert W. Pike, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/761,552

(22) Filed: Jan. 21, 2004

(65) Prior Publication Data

US 2004/0152603 A1  Aug. 5, 2004

Related U.S. Application Data

(62) Division of application No. 09/929,465, filed on Aug. 14, 2001, now abandoned.

(51) Int. Cl.
*E21B 21/00* (2006.01)
*C09K 8/02* (2006.01)
(52) U.S. Cl. .......................... 507/103; 507/136; 175/65
(58) Field of Classification Search ................. 507/103
See application file for complete search history.

(56) References Cited

U.S. PATENT DOCUMENTS

| | | | |
|---|---|---|---|
| 2,816,073 A | 12/1957 | Stratton | |
| 3,684,012 A | 8/1972 | Scheffel et al. | |
| 3,878,117 A | 4/1975 | Williams et al. | |
| 3,912,683 A | 10/1975 | O'Farrell | |
| 3,954,627 A | 5/1976 | Dreher et al. | |
| 4,007,149 A | 2/1977 | Burton et al. | |
| 4,012,329 A | 3/1977 | Hayes et al. | |
| 4,025,443 A | 5/1977 | Jackson | |
| 4,148,821 A | 4/1979 | Nussbaum et al. | |
| 4,151,096 A | 4/1979 | Jackson | |
| 4,153,588 A | 5/1979 | Makowski et al. | |
| 4,240,915 A | 12/1980 | Block | |
| 4,255,268 A | 3/1981 | Block | |
| 4,262,455 A | 4/1981 | Block | |
| 4,366,070 A | 12/1982 | Block | |
| 4,390,474 A | 6/1983 | Nussbaum et al. | |
| 4,422,947 A | 12/1983 | Dorsey et al. | |
| 4,425,462 A | 1/1984 | Turner et al. | |
| 4,428,845 A | 1/1984 | Block | |
| 4,447,338 A | 5/1984 | Lundberg et al. | |
| 4,473,479 A | 9/1984 | Block | |
| 4,488,975 A | 12/1984 | Almond | |
| 4,552,215 A | 11/1985 | Almond et al. | |
| 4,553,601 A | 11/1985 | Almond et al. | |
| 4,619,772 A | 10/1986 | Black et al. | |
| 4,671,883 A | 6/1987 | Connell et al. | |
| 4,787,990 A | 11/1988 | Boyd | |
| 4,802,298 A | 2/1989 | Mueller et al. | |
| 4,810,355 A | 3/1989 | Hopkins | |
| 4,900,456 A | 2/1990 | Ogilvy | |
| 4,964,615 A | 10/1990 | Mueller et al. | |
| 5,045,219 A | 9/1991 | Trahan et al. | |
| 5,106,516 A | 4/1992 | Mueller et al. | |
| 5,189,012 A | 2/1993 | Patel et al. | |
| 5,232,910 A | 8/1993 | Mueller et al. | |
| 5,237,080 A | 8/1993 | Daute et al. | |
| 5,252,554 A | 10/1993 | Mueller et al. | |
| 5,254,531 A | 10/1993 | Mueller et al. | |
| 5,308,401 A | 5/1994 | Geke et al. | |
| 5,318,954 A | 6/1994 | Mueller et al. | |
| 5,318,955 A | 6/1994 | Mueller et al. | |
| 5,318,956 A | 6/1994 | Mueller et al. | |
| 5,330,662 A | 7/1994 | Jahnke et al. | |
| 4,508,628 A | 8/1994 | Walker et al. | |
| 5,333,698 A | 8/1994 | Van Slyke | |
| 5,589,442 A | 12/1994 | Gee et al. | |

(Continued)

FOREIGN PATENT DOCUMENTS

CA         2 088 697         2/1992

(Continued)

OTHER PUBLICATIONS

Defendant M-I, LLC's Reply in Support of its Motion for Summary Judgment of Invalidity with Respect to U.S. Patent No. 6,887,832 with exhibits.

(Continued)

*Primary Examiner*—Timothy J Kugel
(74) *Attorney, Agent, or Firm*—Craig W. Roddy; Karen B. Tripp

(57) ABSTRACT

Environmentally acceptable or regulatory compliant oil-based drilling fluids and methods of using same in drilling a wellbore in a subterranean formation are disclosed. The fluids are able to meet environmental regulations while maintaining acceptable oil mud rheology and overall oil mud performance. The fluids are comprised of an invert emulsion. The base or continuous phase of the emulsion is comprised of esters blended with isomerized olefins, and/or other hydrocarbons, such as paraffins, mineral oils or glyceride triesters or combinations thereof. Alternatively, the emulsion has as a base comprising isomerized olefins blended with other hydrocarbons such as linear alpha olefins, paraffins or naphthenes.

6 Claims, No Drawings

U.S. PATENT DOCUMENTS

| | | | |
|---|---|---|---|
| 5,382,290 | A | 1/1995 | Nahm et al. |
| 5,403,508 | A | 4/1995 | Reng et al. |
| 5,403,822 | A | 4/1995 | Mueller et al. |
| 5,407,909 | A | 4/1995 | Goodhue, Jr. et al. |
| 5,432,152 | A | 7/1995 | Dawson et al. |
| 5,441,927 | A | 8/1995 | Mueller et al. |
| 5,498,596 | A | 3/1996 | Ashjian et al. |
| 5,508,258 | A | 4/1996 | Mueller et al. |
| 5,552,462 | A | 9/1996 | Yeh |
| 5,569,642 | A | 10/1996 | Lin |
| 5,607,901 | A | 3/1997 | Toups, Jr. et al. |
| 5,620,946 | A | 4/1997 | Jahnke |
| 5,635,457 | A | 6/1997 | Van Slyke |
| 5,691,281 | A * | 11/1997 | Ashjian et al. .............. 507/103 |
| 5,744,677 | A | 4/1998 | Wu |
| 5,837,655 | A | 11/1998 | Halliday et al. |
| 5,846,913 | A | 12/1998 | Sawdon |
| 5,849,974 | A | 12/1998 | Clarenbeau et al. |
| RE36,066 | E | 1/1999 | Mueller et al. |
| 5,869,434 | A | 2/1999 | Mueller et al. |
| 5,877,378 | A | 3/1999 | Overstreet et al. |
| 5,909,779 | A | 6/1999 | Patel et al. |
| 5,929,297 | A | 7/1999 | Theriot et al. |
| 5,968,845 | A | 9/1999 | Van Slyke |
| 6,001,790 | A | 12/1999 | Schmitt et al. |
| 6,022,833 | A | 2/2000 | Mueller et al. |
| 6,034,037 | A | 3/2000 | Van Slyke |
| 6,090,754 | A | 7/2000 | Chan et al. |
| 6,107,255 | A | 8/2000 | Van Slyke |
| 6,110,874 | A | 8/2000 | Van Slyke |
| 6,165,946 | A | 12/2000 | Mueller et al. |
| 6,180,572 | B1 | 1/2001 | Mueller et al. |
| 6,211,119 | B1 | 4/2001 | Herold et al. |
| 6,289,989 | B1 | 9/2001 | Mueller |
| 6,515,031 | B2 | 2/2003 | Fefer |
| 2001/0009890 | A1 | 7/2001 | Patel et al. |
| 2004/0064897 | A1 | 4/2003 | Kirsner et al. |
| 2003/0144153 | A1 | 7/2003 | Kirsner et al. |
| 2007/0078060 | A1 * | 4/2007 | Kirsner et al. .............. 507/100 |
| 2007/0078061 | A1 * | 4/2007 | Kirsner et al. .............. 507/103 |
| 2007/0078062 | A1 * | 4/2007 | Kirsner et al. .............. 507/103 |
| 2007/0082822 | A1 * | 4/2007 | Kirsner et al. .............. 507/100 |

FOREIGN PATENT DOCUMENTS

| | | |
|---|---|---|
| EP | 0 124 194 A2 | 7/1984 |
| EP | 0 124 194 A2 | 11/1984 |
| EP | 0 247 801 A2 | 12/1987 |
| EP | 0 254 412 | 1/1988 |
| EP | 0 561 608 A | 9/1993 |
| EP | 0561 608 A2 | 9/1993 |
| EP | 1 111 024 A1 | 6/2001 |
| GB | 2 166 782 A | 5/1986 |
| GB | 2166782 A | 5/1986 |
| GB | 2212192 A | 7/1989 |
| GB | 2287952 B | 3/1996 |
| GB | 2 166 782 A | 5/1996 |
| GB | 2309240 A | 7/1997 |
| WO | WO 83/02949 | 9/1983 |
| WO | WO 83/02949 A1 | 9/1983 |
| WO | WO 95/21225 | 8/1985 |
| WO | WO 93 23491 A | 11/1993 |
| WO | WO 93/23491 A1 | 11/1993 |
| WO | WO 94/16030 A1 | 7/1994 |
| WO | WO 95/06694 A1 | 3/1995 |
| WO | WO 95/09215 | 4/1995 |
| WO | WO 95/09215 A1 | 4/1995 |
| WO | WO 95/21225 A1 | 8/1995 |
| WO | WO 96 22342 | 7/1996 |
| WO | WO 99 50370 A | 10/1999 |
| WO | WO 99-50370 A1 | 10/1999 |
| WO | WO 00 71241 A | 11/2000 |
| WO | WO 00/71241 A1 | 11/2000 |
| WO | WO 02/053676 A1 | 7/2002 |
| WO | WO 02/0533675 A1 | 7/2002 |

OTHER PUBLICATIONS

M-I, LLC's Responsive Brief on the Construction of the Asserted Claims of U.S. Patent No. 6,887,832 with exhibits.

Halliburton's Unopposed Motion for Leave to Exceed Page Limit for its Surreply in Opposition to M-I's Motion for Summary Judgment of Invalidity with the Surreply and other exh.

Halliburton's Unopposed Motion for Leave to Exceed Page Limit for Reply Brief on Claim Construction with Reply Brief and other exhibits.

Friedheim, J.E., "Second-Generation Synthetic Drilling Fluids," SPE Distinguished Author Series: Dec. 1981-Dec. 1983.

Chapter 13, Synthetics, Baroid Fluids Handbook, Revised Aug. 1, 1997.

P.A. Boyd, D.L. Whitfill, T.s. Carter, and J.P. Allamon, New Base Oil Used in Low-Toxicity Oil Muds, 14 J. Petroleum Technology, 1985, pp. 937-942.

Friedheim, J.E., 'Second-Generation Synthetic Drilling Fluids,' SPE Distinguished Author Series, Dec. 1981-Dec. 1983.

Baroid Drilling Fluids, Inc. brochure entitled "Petrofree (TM) The Biodegradable Solution for High-Performance Drilling," (1998) 8 pages.

A. Samuels, H2S Need Not Be Deadly, Dangerous, Destructive, Soc. Petroleum Engineers, SPE 5202, (1974).

R.K. Clark, et al., "Polyacrylamide/Potassium-Chloride Mud for Drilling Water-Sensitive Shales," J Petroleum Tech. 719-727 SPE 5514 (Jun. 1976).

J.E. Friedheim, et al., "An Environmentally Superior Replacement for Mineral-Oil Drilling Fluids," 299-312, SPE 23062, (Sep. 3-6, 1991).

J. H. Rushing, et al., "Bioaccumulation from Mineral Oil-Wet and Synthetic Liquid-Wet Cuttings in an Estuarine Fish," 311-320, SPE 23350, (Nov. 10-14, 1991).

F.V. Jones, et a., "The Chronic Toxicity of Mineral Oil-Wet and Synthetic Liquid-WEt Cuttings on an Estuarine Fish, *Fundulus grandis*," 721-730, SPE 23497, (Nov. 10-13, 1991).

J.E. Friedheim, et al., "Superior Performance with Minimal Environmental Impact: A Novel Nonaqueous Drilling Fluid," 713-726, SPE 25753, (Feb. 23-25, 1993).

S. Park, et al., "The Success of Synthetic-Based Drilling Fliuds Offshore Gulf of Mexico: A Field Comparison to Conventional Systems," 405-418, SPE 26354, (1993).

M. Slater, "Commonly Used Biodegradation Techniques for Drilling Fluid Chemicals, Are They Appropriate," 387-397, SPE/IADC 29376, (1995).

J. Candler, et al., "Seafloor Monitoring for Synthetic-Based Mud Discharged in the Western Gulf of Mexico," 51-69, SPE 29694, (1995).

J.E. Friedheim, et al., "Second Generation Synthetic Fluids in the North Sea: Are They Better?", 215-228, IADC/SPE 35061, (1996).

M. A. Legendre Zevallos, et al., "Synthetic-Based Fluids Enhance Environmental and Drilling Performance in Deepwater Locations," 235-242, SPE 35329 (1996).

E.A. Vik, et al., "Factors Affecting Methods for Biodegradation Testing of Drilling Fluids for Marine Discharge," 697-711, SPE 35981 (1996).

L. Bailey, et al., "Filtercake Integrity and Reservoid Damage," 111-120, SPE 39429, (1998).

P.A. Bern, et al, "Barite Sag: Measurement, Modeling and Management," IADC/SPE 47784 (9 pages)(1998).

L. Xiao, et al., "Studies on the Damage Induced by Drilling Fluids in Limestone Cores," SPE 50711 (17 pages) (1999).

A. Meinhold, "Framework for a Comparative Environmental Assessment of Drilling Fluids Used Offshore," SPE 52746 (10 pages) (1999).

L.J. Fraser, et al., "Formation-Damaging Characteristics of Mixed Metal Hydroxide Drill-In Fluids and a Comparison with Polymer-Base Fluids," SPE 57714 (1999).

P.A. Bern, et al., "Barite Sag: Measurement, Modeling, and Management," SPE 62051, SPE Drill. & Completion 15(1) 25-30 (Mar. 2000).

A. Saasen, et al, "Prediction of Barite Sag Potential of Drilling Fluids from Rheological Measurements," SPE/IADC 29410 (Feb. 26-Mar. 2, 1995).

P.I. Reid, et al, "Field Evaluation of a Novel Inhibitive Water-Based Drilling Fluid for Tertiary Shales," SPE 24979 (Nov. 16-18, 1992).

W. Hite, et al, Better Practices and Synthetic Fluid Improve Drilling Rates, Oil & Gas J. Online (Feb. 20, 1995).

N. Hands, et al, "Drill-in Fluid Reduces Formation Damage, Increases Production Rates," Oil & Gas J. Online (1998).

J.P. Plank, "Water-Based Muds Using Synthetic Polymers Developed for High Temperature Drilling," Oil & Gas J. Online (1992).

Brookfield Instruction Manual for SSV Vane Standard Spindle Set. Brookfield Press Release on Vane Spindles (Mar. 12, 2002), ThomasNet Product News Room.

EPA Development Document for Proposed Effluent Limitations Guidelines for Standards for Synthetic-Based Drilling Fluid and Other Non-Aqueous Drilling Fluids . . . (Feb. 1999).

Environmental Impacts of Synthetic Based Drilling Fluids, U.S. Dept of the Interior, Minerals Management Service, Aug. 2000.

EPA Environmental Assessment of Proposed Effluent Limitations Guidelines for Synthetic-Based Drilling Fluids and Other Non-Aqueous Drilling Fluids . . . (Feb. 1999).

"Horizontal Wells Offer Economic Advantage," Horizontal News, Fall 1996.

A. Saasen, et al, "Monitoring of Barite Sag Important in Deviated Drilling," Oil & Gas J. Online (1991).

Novadril (TM) System, MI Technology Report (1993).

G. Robinson et al, Novel Viscometer for Improved Drilling Fluid Characterization, Baker Hughes INTEQ (1996).

N.J. Alderman, et al, "Vane Rheometry of Bentonite Gels," 39 J. Non-Newtonian Fluid Mechanics 291-310 (1991).

API Recommended Practice Standard Procedure for Field Testing Oil-Based Drilling Fluids, API Rec. Prac. 13B—2, 3rd. ed. (Feb. 1998) American Petroleum Institute.

Deposition Transcript of David Carbajal, co-inventor of US 6,887,832, in Civil Action 6:05CV155, US Dist. Ct. (E.D. TX), Halliburton Energy Serv. v. M-I, LLC, (Jan. 12, 2006).

Deposition Transcript of Kimberly Burrows, co-inventor of US 6,887,832 in Civil Action 6:05CV155, US Dist, CT. (E.D. TX), Halliburton Energy Serv. v. M-l, LLC, (Oct. 26, 2006).

Deposition Transcript of Don Siems, co-inventor of US 6,887,832 in Civil Action 6:05CV155, US Dist. Ct. (E.D. TX), Halliburton Energy Serv. v. M-l, LLC, (Dec. 12, 2005).

Deposition Transcript of Jeff Kirsner, co-inventor of US 6,887,832 in Civil Action 6:05CV155, US Dist. Ct. (E.D. TX), Halliburton Energy Serv. v. M-l, LLC, (Feb. 15, 2006).

Deposition Transcript of Karen Tripp, patent prosecuting attorney for US 6,887,832, CV 6:05CV155, US Dist. Ct. (E.D. TX), Halliburton Energy Serv. v. M-l, LLC, (Jan. 26, 2006).

First Amended Complaint , Civil Action No. 6:05CV155, U.S. Dist. Court, Eastern Dist. of Texas, Tyler Div., Halliburton Energy Services, Inc. v. M-l, LLC., filed Jan. 27, 1006.

M-l, LLC's 2nd Amended Answer, Affirmative Defenses, and Counterclaims, Civil Action No. 6:05CV155, U.S. Dist. Court, Eastern Dist. of Texas, Tyler Div., filed Feb. 10, 2005.

Plaintiff's Preliminary Infringement Contentions, Civil Action No. 6:05CV155, U.S. Dist. Court, Eastern Dist. of Texas, Halliburton Energy Services, Inc. v. M-l LLC, Sep. 16, 2005.

M-l, LLC's Preliminary Invalidity Contentions, CA No. 6:05CV155, U.S. Dist. Court, Eastern Dist. of Texas, Halliburton Energy Services, Inc. v. M-l, LLC, Oct. 28, 2005.

K. Burrows, et al., "New Low Viscosity Ester is Suitable for Drilling Fluids in Deepwater Applications," SPE 66553, Feb. 2001 (14 pages).

L.F. Nicora, "High-Density Invert-Emulsion System with Very Low Solids Content to Drill ERD and HPHT Wells," SPE 65000, Feb. 2001 (17 pages).

D. Eckhout, et al., "Development Process and Field Applications of a New Ester-based Mud System for ERD Wells on Australia's Northwest Shelf," IADC/SPE 62791 (Sep. 2002).

M. Mas, et al., "A New High-Temperature Oil-Based Drilling Fluid," SPE 53941, Venezuela Apr. 1999 (14 pages).

Halliburton's Proposed Terms and Claim Elements for Construction, CV 6.05CV155, US Dist. Ct. (E.D. TX), Halliburton Energy Serv. v. M-I, LLC, Nov. 21, 2005.

Defendant M-l, L.L.C.'s List of Disputed Claim Terms, Civil Action No. 6:05CV155, U.S. Dist. Court, (E.D. TX), Halliburton Energy Services, Inc. v. M-l LLC, Nov. 21, 2005.

Plaintiff's Preliminary Claim Constructions Pursuant to Local Patent Rule 4-2, CV 6.05CV155, US Dist. Ct. (E.D. TX), Halliburton Energy Serv. v. M-l, LLC, Dec. 23, 2005.

Defendant M-l, LLC's Preliminary Claim Construction and Identification of Extrinsic Evidence for U.S. Patent No. 6,887,832, CV 6.05CV155, US Dist. Ct. (E.D. TX), Dec. 23, 2005.

Joint Claim Construction and Prehearing Statement Pursuant to P.R. 4-3, CV 6.05CV155, US Dist. Ct. (ED TX), Halliburton Energy Serv. v. M-l, LLC Jan. 20, 2006.

Defendent M-l, LLC's Motion for Summary Judgment of Invalidity with Respect to U.S. Patent No. 6,887,832.

M-l LLC's Motion for Leave to Add Inequitable Conduct Defense to its Pleadings, CV 6.05CV155, US Dist. Ct. (ED TX), Halliburton Energy Serv. v. M-l, LLC, Jan. 26, 2006.

Halliburton's Opposition to M-l's Motion for Leave to Add Inequitable Conduct Defense to its Pleadings, CV 6.05CV155, US Dist. Ct., Halliburton v. M-l, Feb. 13, 2006.

Plaintiff's Initial Disclosures, Civil Action 6.05CV155, US Dist. Ct. (ED TX), Halliburton Energy Services, Inc. v. M-l, LLC, Sep. 16, 2005.

Defendant M-l, LLC's Initial Disclosures, Civil Action 6.05CV155, US Dist. Ct. (ED TX), Halliburton Energy Services, Inc. v. M-l, LLC, Aug. 19, 2005.

Plaintiff Halliburton's Objections and Responses to Defendant M-l LLC's First Set of Requests for Production, Civil Action 6.05CV155, Halliburton v. MI, Aug. 26, 2005.

Plaintiff Halliburton's Objections and Responses to Defendant M-l LLC's First Set of Interrogatories, Civil Action 6.05CV155, Halliburton v. Ml, Aug. 26, 2005.

Plaintiff Halliburton's Supplemental Responses and Objections to Defendant M-l LLC's First Set of Interrogatories, Civil Action 6.05CV155, Halliburton v. Ml, Oct. 25, 2005.

M-l. LLC's Responses to Plaintiff's First Set of Interrogatories to Defendant (Nos. 1-21), Civil Action 6.05CV155, US Dist. Ct. (ED TX), Halliburton v. Ml, Nov. 16, 2005.

Halliburton's Opening Brief on Claim Construction,Civil Action 6.05CV155, US Dist. Ct. (ED TX), Halliburton Energy Services, Inc. v. M-l, LLC, Mar. 17, 2008.

Halliburton's Unopposed Motion for Leave to Exceed Page Limit for its Markman Brief, CV 6.05CV155, US Dist. Ct., Halliburton Energy Services, Inc. v. M-l, LLC, Mar. 17, 2006.

Baroid Drilling Fluids Product Information Sheet on RM-63, Rheology Modifier (1990) (2 pages).

Baroid Drilling Fluids Product Data Sheets (1993) (121 pages).

Manual of Drilling Fluids Technology, Fundamental Characteristics of Drilling Fluids, NL Baroid/NL Industries, Inc. (1979) (22 pages).

Halliburton Drilling Fluids Technology —Introduction to Drilling, Dril-N & Completion Fluids.

Minute Entry for Markman Hearing Proceedings in Halliburton v. M-l, 6-05cv155, U.S. District Ct., Eastern District of Texas.

Transcript of Markman Hearing Before Hon. L. Davis in Halliburton v. M-l, 6-05cv155, U.S.District Ct., Eastern District of Texas.

Baroid's Environmentally Safe Fluids—Petrofree LV, Accolade (31 pages).

* cited by examiner

DRILLING METHOD USING ISOMERIZED OLEFINS AND PARAFFIN HYDROCARBONS AS BASE OILS FOR INVERT EMULSION OIL MUDS

RELATED APPLICATION

This application is a division of U.S. patent application Ser. No. 09/929,465, of Jeff Kirsner, Kenneth W. Pober, and Robert W. Pike, filed Aug. 14, 2001 now abandoned, and entitled "Blends of Esters with Isomerized Olefins and Other Hydrocarbons as Base Oils for Invert Emulsion Oil Muds", pending, the content of which is incorporated herein by reference.

BACKGROUND OF THE INVENTION

1. Field of the Invention

The present invention relates to compositions and methods for drilling boreholes in subterranean formations, particularly hydrocarbon bearing formations. More particularly, the present invention relates to oil or synthetic based drilling fluids, fluids comprising invert emulsions, and more particularly to drilling fluids utilizing esters which combine high ecological compatibility with good stability and performance properties.

2. Description of Relevant Art

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation.

Oil or synthetic-based muds are normally used to drill swelling or sloughing shales, salt, gypsum, anhydrite or other evaporite formations, hydrogen sulfide-containing formations, and hot (greater than about 300 degrees Fahrenheit) holes, but may be used in other holes penetrating a subterranean formation as well. Unless indicated otherwise, the terms "oil mud" or "oil-based mud or drilling fluid" shall be understood to include synthetic as well as natural or traditional oils, and such oils shall be understood to comprise invert emulsions.

Oil-based muds used in drilling typically comprise: a base oil (or synthetic) comprising the external phase of an invert emulsion; a saline, aqueous solution (typically a solution comprising about 30% calcium chloride and emulsifiers) comprising the internal phase of the invert emulsion; and other agents or additives for suspension, weight or density, oil-wetting, fluid loss or filtration control, and rheology control. An oil-based drilling fluid may commonly comprise between about 50:50 to about 95:5 by volume oil phase to water phase. An all oil mud simply comprises 100% oil by volume; that is, there is no aqueous internal phase.

Oil-based muds or drilling fluids comprise a key segment of the drilling fluids industry. However, increasingly oil-based drilling fluids have been subjected to greater environmental restrictions and performance and cost demands. There is consequently an increasing need and industry-wide interest in new low-cost drilling fluids that provide robust rheology at high and low temperatures simultaneously while still affording environmental acceptance.

SUMMARY OF THE INVENTION

A drilling fluid comprising an invert emulsion is provided in the present invention that provides significant benefits in terms of environmental acceptance or regulatory compliance without compromising or reducing oil mud rheology or overall oil mud performance significantly. The invert emulsion of the invention has a base, or continuous phase, comprising esters blended with isomerized, or internal, olefins and/or other hydrocarbons, such as paraffins, mineral oils, glyceride triesters, or combinations thereof (hereinafter "the ester blends"). Alternatively, the invert emulsion has a base comprising isomerized olefins blended with other hydrocarbons such as linear alpha olefins, paraffins, or naphthenes, or combinations thereof (hereinafter "the hydrocarbon blends"). In still another embodiment, these two alternative base fluids may themselves be blended together to comprise the base of an invert emulsion.

In the ester blends, the ester may be any quantity, but preferably should comprise at least about 10 weight percent to about 99 weight percent of the blend and the olefins or other hydrocarbons should preferably comprise about 1 weight percent to about 99 weight percent of the blend. In the hydrocarbon blends, the isomerized olefins should preferably comprise about 1 weight percent to about 99 weight percent of the blend and the other hydrocarbons should preferably comprise about 1 weight percent to about 99 weight percent of the blend. In the alternative embodiment where the ester blends are blended further with the hydrocarbon blends, the esters may be any quantity, but preferably should comprise at least about 10 weight percent (and less than about 99 weight percent) of the final blend. The esters of the blends of the invention are preferably comprised of fatty acids and alcohols and most preferably about $C_6$ to about $C_{14}$ fatty acids and 2-ethyl hexanol. However, esters made other ways than with fatty acids and alcohols, such as for example, esters made from olefins combined with either fatty acids or alcohols, are also believed effective for use in the blends of the invention.

A method for preparing and using an environmentally acceptable drilling fluid is also provided by the invention. In the method, a drilling fluid is obtained or prepared comprising as its base or continuous phase the blends of the invention. The fluid is then used in drilling boreholes or wellbores in subterranean formations.

DETAILED DESCRIPTION OF PREFERRED EMBODIMENTS

The present invention provides blends that comprise the oil base or continuous phase of an invert emulsion for oil-based drilling fluids or muds that are environmentally acceptable and still effective as drilling fluids. The environmental acceptability or compatibility and retained effectiveness of the fluids for use as a drilling fluid are accomplished through the blending or mixing of the fluids.

In preparing the blends of the invention, preferably the blending or mixing is done, i.e., the blends are made, before the emulsion is formed or before other materials or compounds are added to the fluid.

The blends of the invention most preferably comprise esters, and also preferably comprise isomerized, or internal, olefins. However, blends of the invention may also or alternatively comprise esters with other hydrocarbons. Alternatively, blends of the invention may comprise isomerized olefins and other hydrocarbons.

In blends of the invention with esters, the esters may be used in any quantity. Preferably, however, the esters should comprise at least about 10 weight percent of the blend and may comprise up to about 99 weight percent of the blend. Preferred esters for blending are comprised of about $C_6$ to about $C_{14}$ fatty acids and alcohols, and are particularly or more preferably disclosed in U.S. Pat. No. Re. 36,066, reissued Jan. 25, 1999 as a reissue of U.S. Pat. No. 5,232,910, assigned to Henkel KGaA of Dusseldorf, Germany, and Baroid Limited of London, England, and in U.S. Pat. No. 5,252,554, issued Oct. 12, 1993, and assigned to Henkel Kommanditgesellschaft auf Aktien of Dusseldorf, Germany and Baroid Limited of Aberdeen, Scotland. Esters disclosed in U.S. Pat. No. 5,106,516, issued Apr. 21, 1992, and U.S. Pat. No. 5,318,954, issued Jun. 7, 1984, both assigned to Henkel Kommanditgesellschaft auf Aktien, of Dusseldorf, Germany, may also preferably be used in the blends of the invention. The most preferred esters for use in the blends of the invention are comprised of about $C_{12}$ to about $C_{14}$ fatty acids and 2-ethyl hexanol or about $C_8$ fatty acids and 2-ethyl hexanol. These most preferred esters are available commercially as PETROFREE® and PETROFREE LV™, respectively, from Halliburton Energy Services, Inc. in Houston, Tex.

Isomerized, or internal, olefins for the blends of the invention may be any such olefins, straight chain, branched, or cyclic, preferably having about 10 to about 30 carbon atoms. Isomerized, or internal, olefins having about 40 to about 70 weight percent $C_{16}$ and about 20 to about 50 weight percent $C_{18}$ are especially preferred for blends of the invention. An example of an isomerized olefin for blends of the invention that is commercially available is SF™ Base, available from Halliburton Energy Services, Inc. in Houston, Tex.

As previously noted for the blends of the invention, esters may be blended with other hydrocarbons, in addition to or instead of with isomerized olefins. Particularly, for example, esters may be blended with paraffins, mineral oil hydrocarbons, and/or glyceride triesters, where such other hydrocarbons comprise from about 1 weight percent to about 99 weight percent of the blend.

Paraffins for the blends of the invention may be linear, branched, poly-branched, cyclic, or isoparaffins, preferably having about 10 to about 30 carbon atoms. When blended with esters of the invention, the paraffins should comprise at least about 1 weight percent to about 99 weight percent of the blend, but preferably less than about 50 weight percent. When blended with other hydrocarbons of the invention, particularly isomerized olefins, linear alpha olefins, or naphthenes as will be discussed further below, the paraffins should comprise at least about 1 weight percent up to about 99 weight percent of the blend, but preferably less than about 50 weight percent of the blend. An example of a paraffin suited for blends of the invention that is commercially available is XP-07™, available from Halliburton Energy Services, Inc in Houston, Tex. XP-07™ is primarily a $C_{12-16}$ linear paraffin.

Examples of glyceride triesters for the ester/hydrocarbon blends of the invention include without limitation materials such as rapeseed oil, olive oil, canola oil, castor oil, coconut oil, corn oil, cottonseed oil, lard oil, linseed oil, neatsfoot oil, palm oil, peanut oil, perilla oil, rice bran oil, safflower oil, sardine oil, sesame oil, soybean oil, and sunflower oil.

Further, the blends of the invention may be prepared from esters of the invention mixed with various combinations of the olefin hydrocarbons, paraffin hydrocarbons, mineral oil hydrocarbons and glyceride triesters, and even with the hydrocarbon blends of the invention (as the term "hydrocarbon blends" has previously been defined herein). In such combination blends, the olefin or other hydrocarbon combinations should preferably comprise about 1 to about 99 weight percent of the blend and the esters of the invention should preferably comprise about 10 to about 99 weight percent of the blend, although any quantity of the esters may be used.

The hydrocarbon blends of the invention comprise isomerized olefins blended with other hydrocarbons such as paraffin hydrocarbons. That is, about 1 weight percent to about 99 weight percent isomerized olefins may be blended with about 1 weight percent to about 99 weight percent linear alpha olefins, naphthenes, paraffins, or other similar hydrocarbons, or combinations thereof. The paraffin hydrocarbons may be linear, branched, poly-branched, cyclic, or isoparaffins preferably having about 10 to about 30 carbon atoms. The linear alpha olefins and the isomerized olefins preferably have about 10 to about 30 carbon atoms. The isomerized olefins may be internal olefins (either straight chain or branched), cyclic olefins, or olefins with any other structure (preferably other than linear alpha). The naphthenes or napthenic hydrocarbons may be any saturated, cycloparaffinic compound, composition or material with a chemical formula of $C_nH_{2n}$, where n is a number about 5 to about 30.

These hydrocarbon blends may be further blended with the ester blends of the invention. In such blends, the esters may be any quantity but the esters preferably comprise at least about 10 weight percent and less than about 99 weight percent of the ultimate blend.

The exact proportions of the components comprising the blends of the invention will vary depending on drilling requirements (and characteristics needed for the blends to meet those requirements), supply and availability of the components, cost of the components, and characteristics of the blend necessary to meet environmental regulations or environmental acceptance. The manufacture of the various components of the blends of the invention will be understood by one skilled in the art.

According to the method of the invention, blends of the invention are obtained or prepared and used to comprise the oil (or synthetic) base of an invert emulsion or oil-based drilling fluid. The fluid is used for drilling a borehole or wellbore in a subterranean formation, particularly a formation comprising oil, gas or other hydrocarbons.

The foregoing description of the invention is intended to be a description of preferred embodiments. Various changes in the details of the described blends and method of use can be made without departing from the intended scope of this invention as defined by the appended claims.

What is claimed is:

1. A method of drilling a wellbore in a subterranean formation, said method comprising the steps of obtaining or preparing a drilling fluid comprising an invert emulsion wherein the invert emulsion has a base or continuous phase comprising a blend of isomerized olefins and paraffin hydrocarbons blended with esters, and wherein the esters comprise at least 50 weight percent and less than about 99 weight percent of the blend, the paraffin hydrocarbons comprise less than 50 weight percent of the blend and the isomerized olefins comprise less than 50 weight percent of the blend, and circulating the drilling fluid in the wellbore during drilling.

2. The method of claim 1 wherein the isomerized olefins are selected from the group consisting of internal olefins, cyclic olefins, and mixtures thereof.

3. The method of claim 2 wherein the internal olefins may be straight chain or branched chain.

4. The method of claim 1 wherein the paraffin hydrocarbons are selected from the group consisting of linear paraffins, branched paraffins, poly-branched paraffins, cyclic paraffins, isoparaffins, or mixtures thereof.

5. The method of claim 1 wherein the paraffin hydrocarbons have about 10 to about 30 carbon atoms.

6. The method of claim 1 wherein the isomerized olefins have about 10 to about 30 carbon atoms.

* * * * *